(12) United States Patent
Zamorano et al.

(10) Patent No.: US 11,207,828 B2
(45) Date of Patent: Dec. 28, 2021

(54) THREE-DIMENSIONAL PRINTER

(71) Applicant: HEWLETT-PACKARD DEVELOPMENT COMPANY, L.P., Houston, TX (US)

(72) Inventors: Juan Manuel Zamorano, Sant Cugat del Valles (ES); Luis Ortega, Sant Cugat del Valles (ES); Sergio De Santiago, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 562 days.

(21) Appl. No.: 16/098,411

(22) PCT Filed: Jul. 19, 2017

(86) PCT No.: PCT/US2017/042757
§ 371 (c)(1),
(2) Date: Nov. 1, 2018

(87) PCT Pub. No.: WO2019/017929
PCT Pub. Date: Jan. 24, 2019

(65) Prior Publication Data
US 2020/0353680 A1    Nov. 12, 2020

(51) Int. Cl.
*B29C 64/364* (2017.01)
*B33Y 30/00* (2015.01)
(Continued)

(52) U.S. Cl.
CPC .......... *B29C 64/165* (2017.08); *B29C 64/364* (2017.08); *B33Y 30/00* (2014.12); *B33Y 40/00* (2014.12)

(58) Field of Classification Search
CPC ..... B29C 64/364; B29C 64/165; B29C 64/20; B29C 64/205; B29C 64/209;
(Continued)

(56) References Cited

U.S. PATENT DOCUMENTS

| 7,828,022 B2 | 11/2010 | Davidson et al. |
| 8,545,209 B2 | 10/2013 | Shi et al. |

(Continued)

FOREIGN PATENT DOCUMENTS

| WO | 2014049159 A1 | 4/2014 |
| WO | 2016014545 A1 | 1/2016 |
| WO | 2016114778 A1 | 7/2016 |

OTHER PUBLICATIONS

"Additive Manufacturing & 3D Printing" Retrieved from: https://www.americanelements.com/additive-manufacturing-3d-printing, Jun. 23, 2017, 12 pages.

*Primary Examiner* — Mary Lynn F Theisen
(74) *Attorney, Agent, or Firm* — HP Inc. Patent Department

(57) ABSTRACT

A three-dimensional printer comprising means for build material, a printer carriage and a curtain. The means for depositing the build material deposits same on a printing zone and/or on one or more build material layers deposited on the printing zone. The printer carriage is to move along a first axis over the printing zone and comprises means for treating the build material. The curtain is attached to a first side of the printer carriage with a first side of the curtain and/or configured to move along with the printer carriage such that the curtain covers at least an area of the print zone, wherein the area varies dependent on the moving of the printer carriage over the print zone.

20 Claims, 3 Drawing Sheets

(51) Int. Cl.
*B33Y 40/00* (2020.01)
*B29C 64/165* (2017.01)

(58) Field of Classification Search
CPC ....... B29C 64/00–393; B22F 10/00–85; B22F 12/00–90
See application file for complete search history.

(56) References Cited

U.S. PATENT DOCUMENTS

| | | |
|---|---|---|
| 2006/0071367 A1 | 4/2006 | Hunter et al. |
| 2013/0209600 A1 | 8/2013 | Tow |
| 2015/0367576 A1 | 12/2015 | Page |
| 2016/0236408 A1 | 8/2016 | Wolf |
| 2016/0339634 A1 | 11/2016 | Fuller |
| 2017/0355137 A1* | 12/2017 | Ederer .................. B29C 64/165 |
| 2018/0370140 A1* | 12/2018 | Iwase .................... B33Y 10/00 |

* cited by examiner

THREE-DIMENSIONAL PRINTER

BACKGROUND

A three-dimensional printing system based on powder fusing may comprise a printing bucket where the parts are fused or sintered layer by layer. During the process, thin layers of powder (in general build material) are deposited on the so-called print zone or printing bed surface. The thickness of these layers may generally be around 100 microns or less.

After depositing the layer, the system prints with one or multiple printing agents, such as a fusing agent, one or multiple patterns that may correspond to the cross-section of the layer of a part to be printed. This printing process with printing agents may be performed by one or multiple printheads on a printing carriage which can move in a scan axis from one side of the printer bed to the other side. The carriage may have a printer head aligned in an orthogonal way related to the scan axis: This way the printer can print over the entire printer bed surface with the described mechanism. After that, a fusing lamp applies heat to the powder layer causing those portions of the powder on which fusing agent was printed to heat up, melt, and fuse.

DETAILED DESCRIPTION

Figure 1:
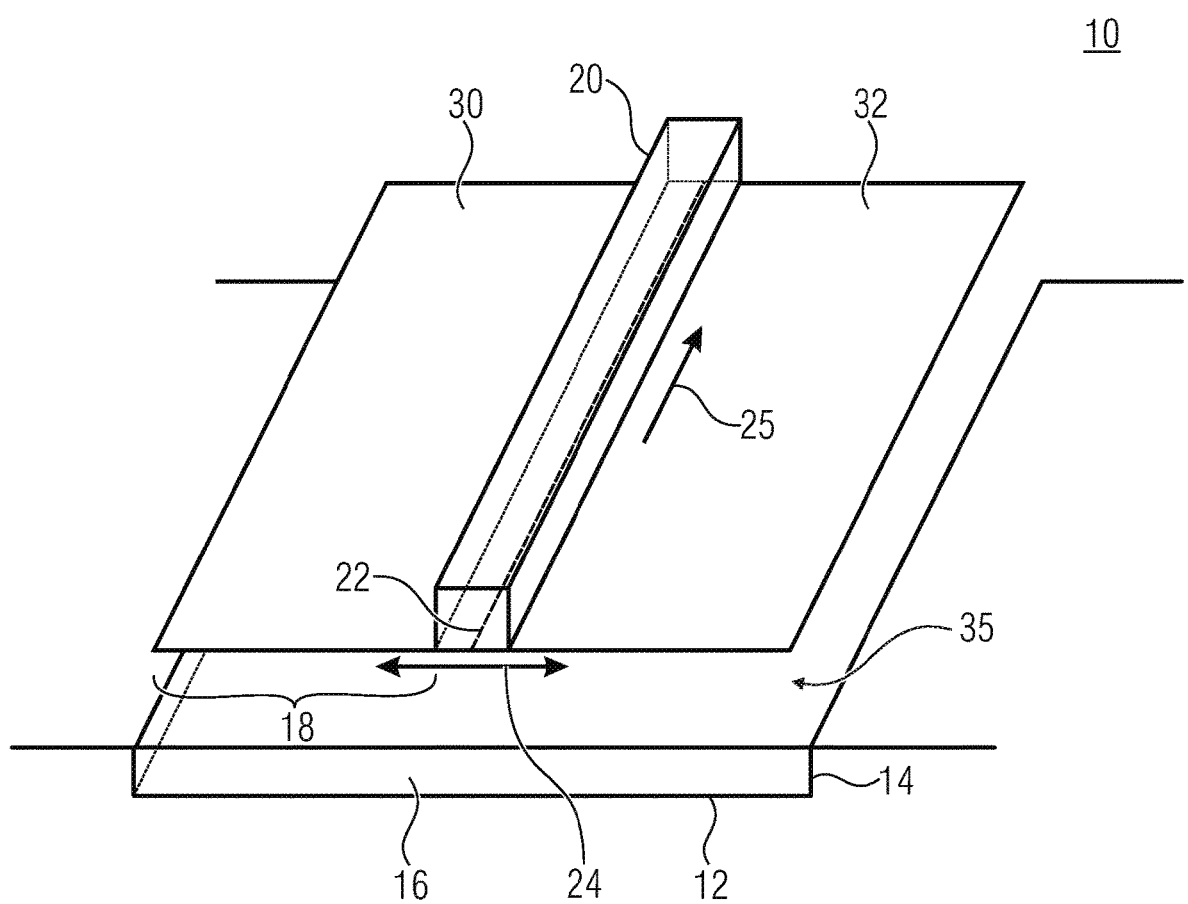
FIG. 1 shows a schematic block diagram of an example 3D printer which makes use of the present disclosure.

FIG. 1 shows a 3D printer 10. The element to be printed is printed in a so-called print zone 12, e.g. formed by a printer bed 14. The printer bed 14 may comprise a build platform which is moved down a distance corresponding to the height of the layer of build material 16 to be formed. The printer bed 14 and thus the print zone 12 may be a removable part of the printer 10 or integrated into same. On the print zone 12, thin layers of the build material 16 are deposited. The depositing is performed layer by layer using means (not shown) for depositing build material. Between the deposition of the respective layers fusing of the deposited build material 16 may be performed which will be described below.

The build material 16 may be a powder, such as a plastic powder, or powder-type material, or a metal powder having small particle sizes, wherein the particle size (particle diameter) depends on the selected material. For example, the so called PA12 having a particle diameter of 60 microns may be used. Another powder material is the so-called PA11 which is more heterogeneous and has diameters between 10 to 50 microns, i.e., up to six times smaller than the PA12. The small particles of the PA11 are light so that these particles tend to leave the print zone 12 (in an uncontrolled way) due to multiple reasons, such as air turbulences.

Between each layer deposition the build material 16 is treated, e.g., sintered or fused. Depending on the used build material 16, different treating procedures may be used. For example, SLS machines (selective laser sintering machines) are used to directly fuse a new section of the new part in the new layer 16 using a laser beam, while thermal fusing use agents to fuse selectively with the help of fusing lamps. Chemical binder agent systems, such as binder jet type systems, print a chemical binder on layers of build material. The treatment is performed using the treating means 22, e.g., a printhead. The printhead or, in general, the means 22 treating the build material 16 are arranged on a printer carriage 20.

The printer carriage 20 is to move along a first axis (marked by the reference numeral 24) extending in parallel to a first dimension of the print zone 12. The carriage 20 and the treatment means 22 may extend along a second direction (cf. reference numeral 25), e.g. perpendicular to the first axis 24. For example, the treatment means 22 (printer head) may be formed by an array of print heads that spans the whole width 25 of the build platform, and is thus able to address the whole surface of the build platform 12 in a single pass of the carriage 20 over the build platform 12 along the axis 24. Note that the scanning treatment means 22 may also be used in one or multiple passes.

This movement of the carriage 20 over the printing platform 12 creates turbulent airflows within the volume 35 between the carriage 20 and the build material 16. The turbulent airflows may be generated in front of the moving carriage 20 due to displacement of air and/or behind the moving carriage 20 as turbulences. The turbulent airflows or turbulences may depend on factors such as the carriage speed, the carriage shape. The impact of the turbulent airflows on the build material depends on the particle weight and particle sizes of the build material 16 (e.g. powder). In order to reduce the turbulent airflows or turbulences at least a curtain 30 is provided.

The curtain 30 is arranged so as to avoid or reduce the movement of the air in the volume 35 below the carriage 20 during the movement of the carriage 20. In detail, the curtain 30 is attached to a first side of the printer carriage 20 (with a first side of the curtain 30) and arranged extending over an area 18 of the print zone 12 which is passed by the printer carriage 20 during the movement along the axis 24. Due to the coupling of the curtain 30 and the carriage 20, the curtain 30 moves dependent on the movement of the carriage 20 along the axis 24. As shown, the curtain 30 may be arranged within a plane within which the carriage 30 is moved, i.e., a plane extending along the axis 24 and along the extension of the carriage 20. As a consequence of this, the curtain 30 lies substantially in parallel to the print zone 12.

The curtain 30 covers a large area of the print zone 12 and the build material layers 16, wherein the coverage of the print zone 12 varies dependent on the position of the carriage 20; i.e. such that, as the carriage 20 moves over the print zone 12 the portion of the print zone 12 covered by the curtain 30 changes. The coverage of the area in front and/or behind the moving carriage 20 prevents—at least in the covered area of the print zone 12—air being disturbed during the carriage movement. Consequently, the curtain 30 helps to reduce turbulence associated with carriage movement.

According to another disclosure, the curtain 30 may be arranged so that only the carriage 20 (or the printhead) moves. According to this disclosure, the curtain 30 is fixed and becomes simply displaced by the carriage 20 as the carriage 30 moves back and forth.

The carriage 20 may be moved back and forth along the axis 24. Thus, in one example the printer 10 may comprise a second curtain 32 arranged on the opposite side of the carriage 20. The two curtains 30 and 32 together with the carriage 20 cover the entire print zone 12. Below the curtains 30 and 32 a volume 35 is defined and enclosed between the curtains 30 and 32 and the print zone 12. During the movement of the carriage 20, the curtains 30 and 32 basically assure that there is no or nearly no volume change of the volume 35 below the carriage. Note that the definition of volume change means both the size of the volume and the shape of the volume itself. According to a disclosure, the one or two curtains 30 and 32 are fitted flush, or substantially flush, to a bottom surface of the carriage 20 and/or the printhead (means for fusing 22). As a result of the flush fitting there are no elements protruding into the volume 35 such that any element can cause an air shift in the volume 35. Due to the non-present volume change of the volume 35 below the carriage 20, there is a significantly reduced air movement assuring no or at least significantly reduced turbulences may be created over the print zone 12. To sum up, the discussed mechanism comprising the one or two curtains 30 or 32 prevents, or at least reduces thin powder particles or, in general, the build material 16 to uncontrollably leave the print zone 12 during the printing process. The mechanism can also help to minimize 3D printing maintenance associated with continuous powder leakage all over the machine, damaging electronic and mechanical parts, such as PCAs or air filters. This enables to increase the productivity and maintenance time (long life for filters and low impact in electronics due to a cleaner printer chamber).

Additionally, the part quality may be increased since the negative effect of the turbulences on the powder layers is reduced. As described above powder having smaller particles, such as PA11 (10 microns), could have a positive effect on the part quality. However, such powder is sensitive to air turbulence. Since a three-dimensional printer according to the described disclosure enables to reduce turbulences, powder having smaller particles can be supported.

With respect to FIG. 2, a further example for a printer will be discussed. FIGS. 2a and 2b shows a printer 10' comprising a print zone 12 (arranged in a build unit/chamber 14), wherein a plurality of layers 16' have been deposited layer by layer with build material treating procedures in between such that the shown 3D elements 17 can be produced. The treating procedures are performed using the carriage 20 and especially the treating means 22' of the carriage.

The carriage 20 is moved along the axis 24 such that same passes the print zone. Within the illustration of FIG. 2a, the carriage is arranged on a first end position of the axis 24. The illustration of FIG. 2b shows the same printer 10, wherein the carriage 20 is arranged in a second position closer to the opposite end position of the axis 24.

According to this disclosure, two curtains 30 and 32 are arranged such that the curtain 30 extends from the carriage 20 in a first direction along the axis 24, while the curtain 32 extends in a second direction opposite to the first direction along the axis 24. In other words, this means that the entire curtain 30 plus 32 is composed by two sections, one on each carriage side. When the carriage 20 moves towards one side, the section of the curtain 30 approached by the carriage 20 is retracted, while the other curtain section is stretched. The opposite behavior is expected when the carrier moves in the opposite direction.

Both curtains 30 and 32 are attached to the housing (not shown) by use of a sprung or motor driven roller. The roller 34 is configured to roll up and unroll the curtain 30, while the roller 36 is configured to roll up and unroll the curtain 32. Thus, each curtain 30 and 32 is arranged between the respective roller 34/36 and the carriage 20. The movement of the carriage 20 causes one curtain, e.g., the curtain 32, to be pulled out of the roller 36 while the roller 34 rolls the curtain 30 up. The rolling up may be supported by use of a spring or another mechanism. The concept of rolling in and out becomes clear when comparing the two different positions of the carriage 20 illustrated by FIGS. 2a and 2b.

Figure 2A:
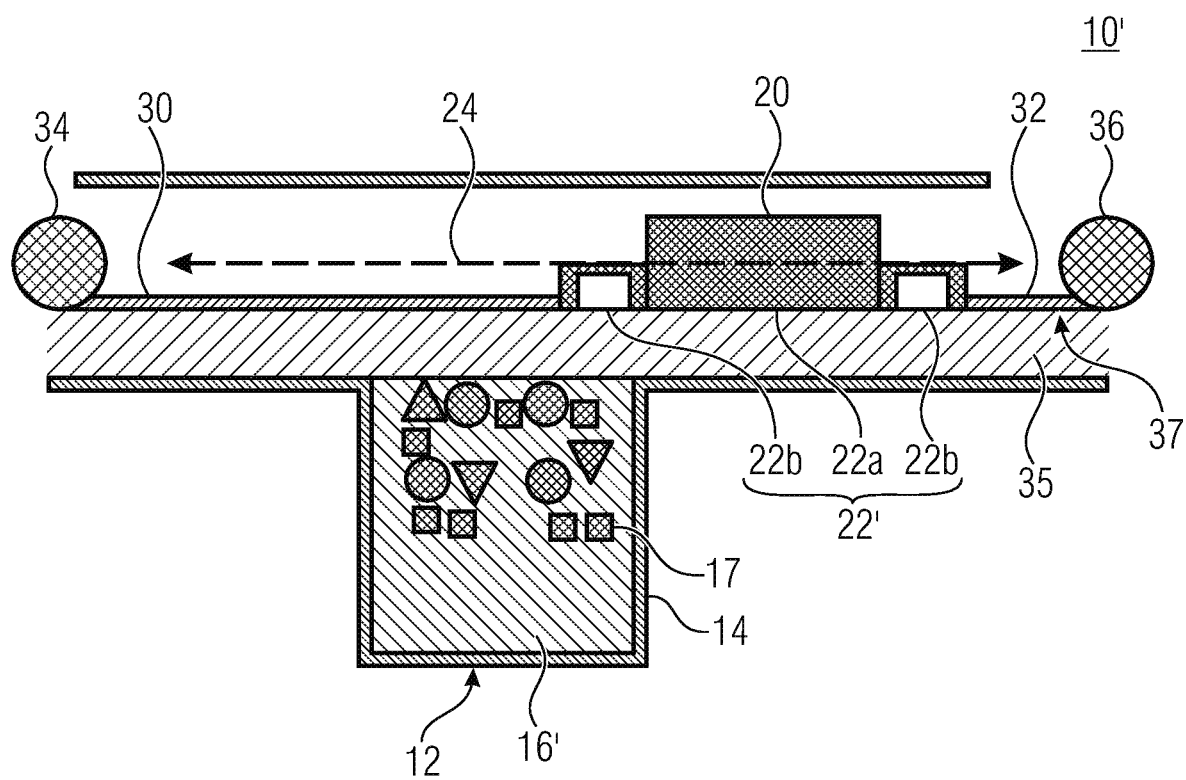
FIGS. 2a and 2b show schematic block diagrams of other examples of the 3D printer, which makes use of an enhanced present disclosure, in two different printing stages.
Figure 2B:
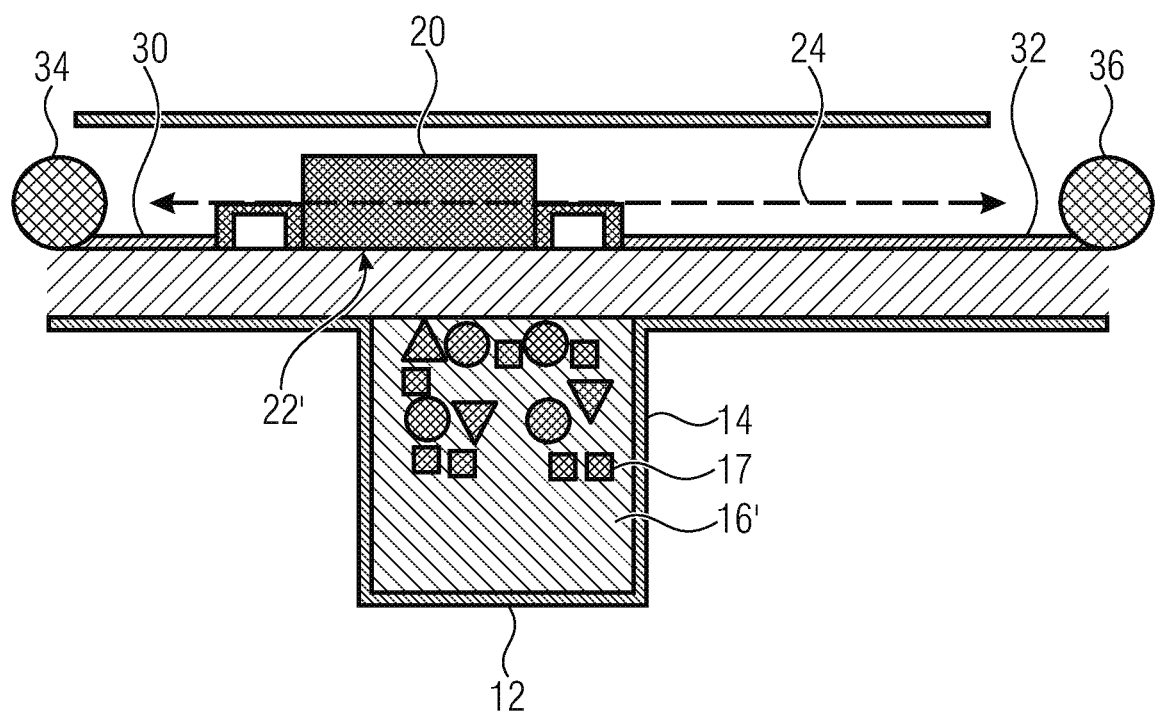

As can be seen, the unreeled curtain 32, within the configuration of FIG. 2b, is enlarged when compared to the same curtain 32 within the configuration of FIG. 2a. The consequence of the rolling procedure performed by the rollers 34 and 36 is such that the curtains 30 and 32 are arranged to cover the area passed by the carriage 20 independently from the movement of the carriage 20. It should be noted that, according to another disclosure, the rollers may also be arranged at the carriage.

From another point of view the configuration of FIGS. 2a and 2b may be described as follows: the curtains 30 and 32 are arranged in parallel to the print zone and formed together with a bottom area or bottom side of the carriage 20, a common plane or plane. This plane is marked by the reference numeral 37 and defines, together with the print zone 12, the volume 35. As discussed above, the volume 35 is not changed during the movement of the carriage 20.

A side effect of the arrangement of the two curtains 30 and 32 is that the area between the carriage 20 and the print zone 12 (dust section 35) is separated from the other areas where the mechanical parts and/or here the electronics are arranged. The enclosing of the dust section 35 enables to prevent particles influencing the mechanics or the electronics.

As illustrated, the means 22' for treating the build material 16' comprises, according to the disclosure of FIGS. 2a and 2b, two entities, namely a first entity such as a printhead comprising nozzles to provide the agents to the build material 16' (cf. reference numeral 22a) and a second entity for performing the fusion, namely one or more fusing lamps marked by the reference numeral 22b. The fusing lamps 22b may be arranged at two sides of the centrally arranged first entity 22a. The first entity 22a may comprise one or more agent outlets or nozzles for the agents which may be activated separately. The performed treatment of the means 22 follows a two-stage procedure. First the agent, e.g., an agent facilitating the fusion or an agent preventing the fusion, is provided to the respective build material layer 16'. Then, the fusion is performing, e.g., by applying energy or heat to the build material 16 or the build material 16 soaked with the agent. Other agents for selectively modifying the material property may be used, too.

Since the temperatures for the fusion are quite high, the energy level provided by the fusion lamps 22b should also be high. In order to lower the energy level for the fusion lamps 22b, a preheating may be performed. This preheating will be discussed with respect to FIG. 3.

Figure 3:
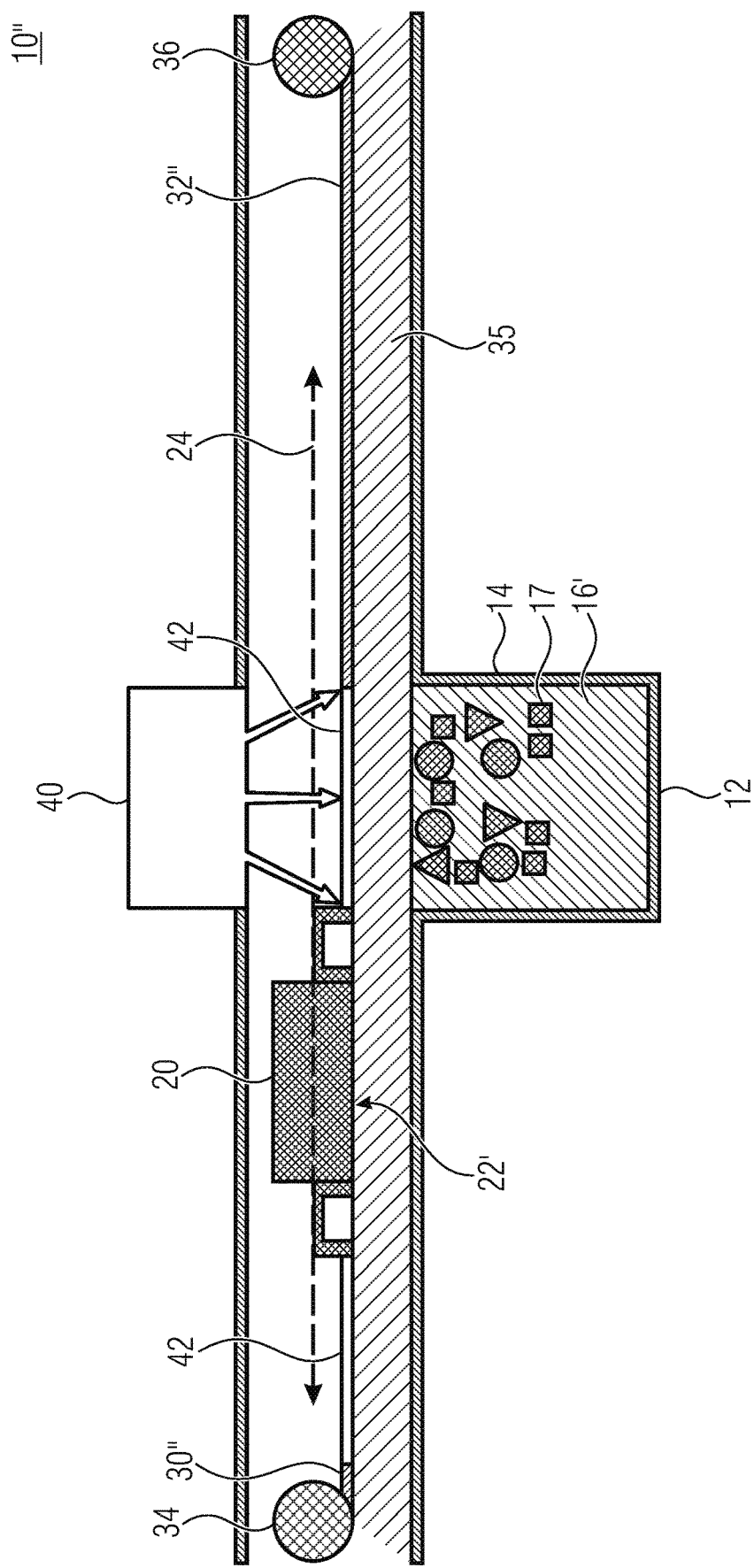
FIG. 3 shows a schematic block diagram of an enhanced example of the 3D printer according to the present disclosure.

The printer 10" of FIG. 3 substantially complies with the printer 10' of FIGS. 2a and 2b, wherein an additional element, namely a preheater for preheating the build material, is provided. The preheater is marked by the reference numeral 40. The preheater 40 may be realized as a top lamp located over the carriage 20, i.e., opposite to the print zone 12.

The pre heating has purpose to bring the temperature of the build material 16' in the range of its fusing temperature but not above the fusion temperature. The consequence is that the energy application performed by the fusion lamps 22b is reduced.

As shown by the disclosure of FIG. 3, the preheating element 40 may be arranged above the carriage 20 so that it radiates towards the curtain. In order to enable such radiating a hybrid curtain 30" or 32" may be used. The curtain 30"

and 32", or at least one of the curtains, comprising a window arranged next to the carriage 20 may be used. The one or more windows are marked by the reference numerals 42 and provide access from the top lamp 40 to the print zone 12 when the carriage 20 moves to the other side. The goal of this hybrid solution is to allow an overhead fusing lamp 40 to be used, while avoiding pumping air over the printing platform 12 during carriage movement.

It is noted that when glass is used for the window 42, the windows are not flexible and may not be rolled up using the rollers 34 and 36. Consequently, an entire curtain mechanism comprising the two curtains 30" and 32" and the rollers 34 and 36 have an enlarged space when compared to the example of FIGS. 2a and 2b. As can be seen when comparing the example of FIG. 2b and FIG. 3 the width of the entire mechanism is enlarged by the width of the two windows 42.

Although in the above examples it has been discussed that the curtain 30 as well as the curtain 32 is attached to the carriage 20, it should be noted that this does not mean that the curtains 30 and 32 have to be directly attached to the carriage. For example, if the rollers 34/36 are not arranged sideward, the roller may be arranged such that same couples the curtain 30/32 with the respective side of the carriage 20. Additionally, different elements may be arranged in between.

With regard to the above implementations, in particular with regard to the example of FIGS. 2a, 2b and 3, it has been discussed that below the curtains a volume 35 is enclosed. The volume 35 is enclosed by the print zone 12 and a plane 37 formed by the curtains 30/32 or 30"/34" together with a bottom side facing to the print zone 12 of the carriage 20. Note that the enclosure/volume 35 may be formed such that the enclosure/volume 35 is not a completely sealed enclosure. The plane may be planar or may be formed by a different surface. In order to achieve a planar surface, the two curtains 30 and 32 may be fitted flush with the carriage 20 and/or the treating means 22 (printer head). In order to avoid the optimum minimization of the volume change and, thus, the maximum avoidance of turbulences, the bottom surfaces of the curtains 30 and 32 as well as the bottom surface of the carriage move within a common plane.

The plane or common plane may be substantially arranged in parallel to the print zone 12 and the layers 16' on the print zone 12. In this context, it should be noted that even a small tilt of the plane formed by the curtains and the print zone/layers would enable to reduce the turbulences especially when the plane of the curtains extend along the movement axis 24 (cf. FIG. 1).

According to a disclosure, according which a roller is used for the curtain, it should be noted that the roller mechanism is arranged between a housing and a second side of the curtain (while first side of the curtain is attached to the carriage).

According to a disclosure, the curtain, the carriage and the other curtain separate a print zone section from a further section of the three-dimensional printer independently from the movement of the carriage.

According to a disclosure, according which the curtain and the other curtain are fitted flush to the carriage, it should be noted that common plane or surface is formed by the curtain, the other curtain and a bottom side of the carriage/printer head. This common plane or surface and the print zone define a volume in between, wherein the volume and a size of the volume remains constant independent from the moving of the carriage along the first axis.

According to a disclosure, the carriage extends perpendicular to the first axis and/or wherein the curtain extends along the carriage.

The above disclosure may also be used in 2D printers to reduce air turbulence and hence ink aerosol in high-speed printing systems. Thus, according to another disclosure a (general) printer is provided. The printer comprises means for depositing build material on a print zone; a printer carriage which is to move along a first axis over the print zone and comprises the means for depositing build material on a print zone or means for treating the build material; and a curtain attached to a first side of the printer carriage with a first side of the curtain and/or configured to move along with the printer carriage such that the curtain covers at least an area of the print zone, wherein the area varies dependent on the moving of the printer carriage over the print zone.

Although some aspects have been described in the context of an apparatus, it is clear that these aspects also represent a description of the corresponding method, where a block or device corresponds to a feature of the method. Analogously, aspects described in the context of a method also represent a description of a corresponding block or item or feature of a corresponding apparatus. Parts of the method or the entire method may be executed by (or using) a hardware apparatus, for example, a microprocessor, a programmable computer or an electronic circuit. In some disclosures, some one or more method features may be executed by such an apparatus.

The above described disclosures are merely illustrative for the principles of the present disclosure. It is understood that modifications and variations of the arrangements and the details described herein will be apparent to others skilled in the art. It is the intent, therefore, to be limited by the scope of the impending patent claims and not by the specific details presented by way of description and explanation of the disclosures herein.

The invention claimed is:

1. A three-dimensional printer comprising:
    a print zone to receive successive stacked build material layers deposited on the print zone;
    a printer carriage which is to move along a first axis over the print zone for treating the build material; and
    a curtain attached to a first side of the printer carriage with a first side of the curtain to move along with the printer carriage such that the curtain covers at least an area of the print zone, wherein the area varies dependent on the moving of the printer carriage over the print zone, the curtain to prevent air turbulence in a volume below the curtain and over the print zone.

2. A three-dimensional printer according to claim 1, further comprising a second curtain attached to a second side of the printer carriage and arranged extending over another area of the print zone passed by the printer carriage.

3. A three-dimensional printer according to claim 2, wherein the curtain and the other curtain are fitted flush with a bottom area of the carriage facing towards the print zone.

4. A three-dimensional printer according to claim 1, wherein the curtain is fixed to a housing of the three-dimensional printer with a second side of the curtain.

5. A three-dimensional printer according to claim 1, wherein the three-dimensional printer comprises a roller to roll up and unroll the curtain;
    wherein the roller is to perform the rolling up and rolling out of the curtain along the first axis, wherein the moving of the carriage along the first axis induces the rolling up and rolling out of the curtain.

6. A three-dimensional printer according to claim 5, wherein the roller comprises spring that causes rolling up of the curtain, when the carriage is moved towards the roller, and allows rolling out the curtain, when the curtain is pulled by the carriage.

7. A three-dimensional printer according to claim 5, wherein the roller is located on a side of the print zone.

8. A three-dimensional printer according to claim 1, wherein the curtain is arranged in a plane within which the carriage is moved.

9. A three-dimensional printer according to claim 1, wherein the carriage comprises a fusing lamp for fusing a build material.

10. A three-dimensional printer according to claim 1, wherein the carriage comprises a printhead for treating the build material with at least one agent out of a group comprising agents for fusing the build material, agents for avoiding a fusion of the build material and agents for changing a property of the build material.

11. A three-dimensional printer according to claim 1, wherein the curtain comprises a window.

12. A three-dimensional printer according to claim 11, wherein the window is aligned with a heater above the carriage to allow the heater to pre-heat build material in the print zone through the window.

13. A three-dimensional printer according to claim 11, wherein the window is made of glass.

14. A three-dimensional printer according to claim 1, wherein the three-dimensional printer comprises preheater to preheat the build material, wherein the preheater is arranged within the three-dimensional printer such that the curtain lies between the preheater and the print zone.

15. A three-dimensional printer according claim 1, wherein the curtain is formed by a metal layer or a PTFE layer.

16. A three-dimensional printer comprising:
a print zone to receive successive stacked build material layers deposited on the print zone;
a printer carriage which is to move along a first axis over the print zone for treating the build material; and
one or more curtains attached to the printer carriage and a side of the print zone, such that the one or more curtains and a bottom area of the carriage facing the print zone define a plane;
wherein a volume is enclosed by the one or more curtains, the printer carriage and the print zone.

17. A three-dimensional printer according to claim 16, wherein the volume and a size of the volume remains constant during the movement of the carriage.

18. A three-dimensional printer according to claim 17, wherein the roller is located on the carriage.

19. A three-dimensional printer according to claim 16, wherein each of the one or more curtains is mounted on a roller that rolls to extend or retract a portion of a corresponding curtain with movement of the carriage.

20. A printer comprising:
a print zone to receive successive stacked build material layers deposited on the print zone;
a printer carriage which is to move along a first axis over the print zone for depositing build material on a print zone or for treating the build material; and
a curtain attached to a first side of the printer carriage and a second curtain attached to a second, opposite side of the printer carriage, the curtains to move along with the printer carriage such that the curtain covers curtains cover at least an area of the print zone, wherein the area varies dependent on the moving of the printer carriage over the print zone, the printer carriage and curtains extending an entire width of the print zone when the printer carriage is in a middle of the print zone.

* * * * *